(12) United States Patent
Grimm et al.

(10) Patent No.: US 6,616,037 B2
(45) Date of Patent: Sep. 9, 2003

(54) INVENTORY SYSTEM

(76) Inventors: Roger L Grimm, 314 San Carlos Ave., Redwood City, CA (US) 94061; Dean P Grimm, 40265 Jacinto Way, Palmdale, CA (US) 93551

( * ) Notice: Subject to any disclaimer, the term of this patent is extended or adjusted under 35 U.S.C. 154(b) by 0 days.

(21) Appl. No.: 09/932,184

(22) Filed: Aug. 17, 2001

(65) Prior Publication Data

US 2003/0034392 A1 Feb. 20, 2003

(51) Int. Cl.[7] .............................................. G06F 17/60
(52) U.S. Cl. ....................... 235/385; 235/375; 235/376; 705/28; 222/23; 222/22
(58) Field of Search ................................ 235/375, 376, 235/385; 705/28; 222/23, 22

(56) References Cited

U.S. PATENT DOCUMENTS

| 4,563,739 | A | | 1/1986 | Gerpheide et al. | |
|---|---|---|---|---|---|
| 5,250,789 | A | * | 10/1993 | Johnsen | 705/14 |
| 5,255,819 | A | * | 10/1993 | Peckels | 222/1 |
| 5,603,430 | A | * | 2/1997 | Loehrke et al. | 222/1 |
| 5,986,219 | A | | 11/1999 | Carroll et al. | |
| 6,036,055 | A | * | 3/2000 | Mogadam et al. | 222/23 |
| 6,427,871 | B1 | * | 8/2002 | Suero | 222/36 |

* cited by examiner

*Primary Examiner*—Karl D. Frech
*Assistant Examiner*—Seung H Lee
(74) *Attorney, Agent, or Firm*—James E. Brunton

(57) ABSTRACT

A computer-based system for taking the physical inventory of beverages dispensed in full and partially full containers so as to effectively control the theft and overpouring. The products to be inventoried, such as liquor bottles are identified by conventional barcodes that can be scanned by a scanner that is operably interconnected with a hand-held computer. The step of scanning the barcodes produces, on the touch-sensitive screen of the hand-held computer, product information concerning the product contained within the scanned bottle including a silhouette of the bottle. In accomplishing the inventory, the user indicates by touching on the silhouette of the bottle the fluid level within the bottle. This information is inputted in the computer data storage and is used to calculate the volume of beverage remaining in the bottle.

12 Claims, 4 Drawing Sheets

INVENTORY SYSTEM

BACKGROUND OF THE INVENTION

1. Field of the Invention

The present invention relates generally to a system for use in taking an inventory of products dispensed in full and partially full containers. More particularly, the inventory system of the present invention concerns a computerized system where inventorying beverages such a liquor where the products are identified by code such as conventional barcodes.

2. Discussion of the Prior Art

The inventory and control of beverages such as liquor has traditionally been a major concern for owners of establishments that dispense liquor and similar types of beverages. More particularly, without some type of control, theft and overpouring can become a major problem. In the past, several attempts have been made to solve the problems involved in the effective control of liquor dispensing by bars, nightclubs and like establishments. One of these attempts involves a system whereby the beverage containers are weighed for the purpose of determining the quantity of beverage that has been dispensed over a particular time period.

Other attempts for controlling the dispensing of beverages has also been devised and takes the form of rather complex systems wherein the beverage is dispensed through a machine of some type and measure in real time the dispensing of the beverage through the machine. These types of systems, however, are more in the nature of control systems rather than complete inventory and management systems.

A prior art inventory system that involves weighing of the containers is described in U.S. Pat. No. 4,563,739 issued to Gerpheide. This system includes means for identifying each particular product dispensed by sensing a code such as a barcode that is attached to the container. A weighing scale or cell is also provided for weighing containers that are partially filled with the product. A computer is included within the system, and the computer includes product record information concerning each particular product dispensed. A conventional barcode reader is moved across the code on the container and signals the supply to the computer by which the particular product in the container is identified. Signals from the weighing cell or weighing devices are also received by the computer. By correlating the weight signals with the product identification signals and using the product record information in the computer memory, the quantity of product remaining in the partially filled containers is automatically calculated. Current, on-hand, and previously on-hand inventory data is maintained in the computer memory and is up-dated with each subsequent inventory.

Another method for inventorying liquor is disclosed in U.S. Pat. No. 5,986,219 issued to Carroll. The Carroll method is implemented with the aid of a weigh scale and a computer program and includes the steps of separating all of the liquor bottles in the bar or restaurant into a plurality of categories based on similar characteristics between the liquor bottles such as liquor costs; determining an approximate average cost of liquor per unit weight in each category; weighing all of the bottles in a category in groups after a shift to determine how much liquor was dispensed from the category; determining the approximate cost of liquor dispensed from all of the liquor bottles within the category and comparing the approximate total cost of liquor dispensed from the category to the amount of revenue received.

As will be better understood from the discussion that follows, the apparatus of the present invention is easier and faster to use than the prior art apparatus. Because weighing of the beverage containers is not necessary, the apparatus is less complex in construction and is less expensive to manufacture and maintain.

SUMMARY OF THE INVENTION

It is an object of the present invention to provide an accurate and easy-to-use, computer-based system for taking the physical inventory of beverages dispensed in full and partially full containers so as to effectively control the theft and overpouring. More particularly, it is an object of the invention to provide such an inventory system in which the products are identified by code, such as conventional barcodes that can be scanned by a scanner that is operably inter-connected with a hand-held computer.

Another object of the invention is to provide an inventory system of the aforementioned character in which the step of scanning the barcodes produces, on the screen of the hand-held computer, product information concerning the product contained within the scanned bottle including a silhouette of the bottle.

Another object of the invention is to provide an inventory system as described in the preceding paragraphs including data input means whereby the user inputs data to the computer data storage system via the touch-sensitive screen of the computer.

Another object of the invention is to provide an inventory system as described in the preceding paragraph in which the user can, through use of the touch-sensitive screen, indicate on the silhouette that appears on the screen, the level of the beverage contained within the bottle that has been scanned.

Another object of the invention is to provide an inventory system that enables the user to keep track of the quantity of beverage dispensed so as to accurately determine the pouring costs of pouring a particular beverage.

Another object of the invention is to provide an inventory system that is useful in taking the physical inventory of all bottles, liquor, beer, wines and like beverages.

Another object of the invention is to provide an inventory system of the aforementioned character in which the inventory information entered into the system can be transferred directly to an accountant or other administrative person via a modem that forms a part of the computer means of the invention.

Another object of the invention is to provide an inventory system that is easy to use, highly reliable in operation and requires a minimum of operator training. These and other objects of the invention will become more apparent from the discussion that follows:

BRIEF DESCRIPTION OF THE DRAWINGS

FIG. 2 is a generally diagrammatic view of the initial screen that appears on the hand-held computer shown in FIG. 1 when the computer is turned on.

DESCRIPTION OF THE INVENTION

Figure 1:
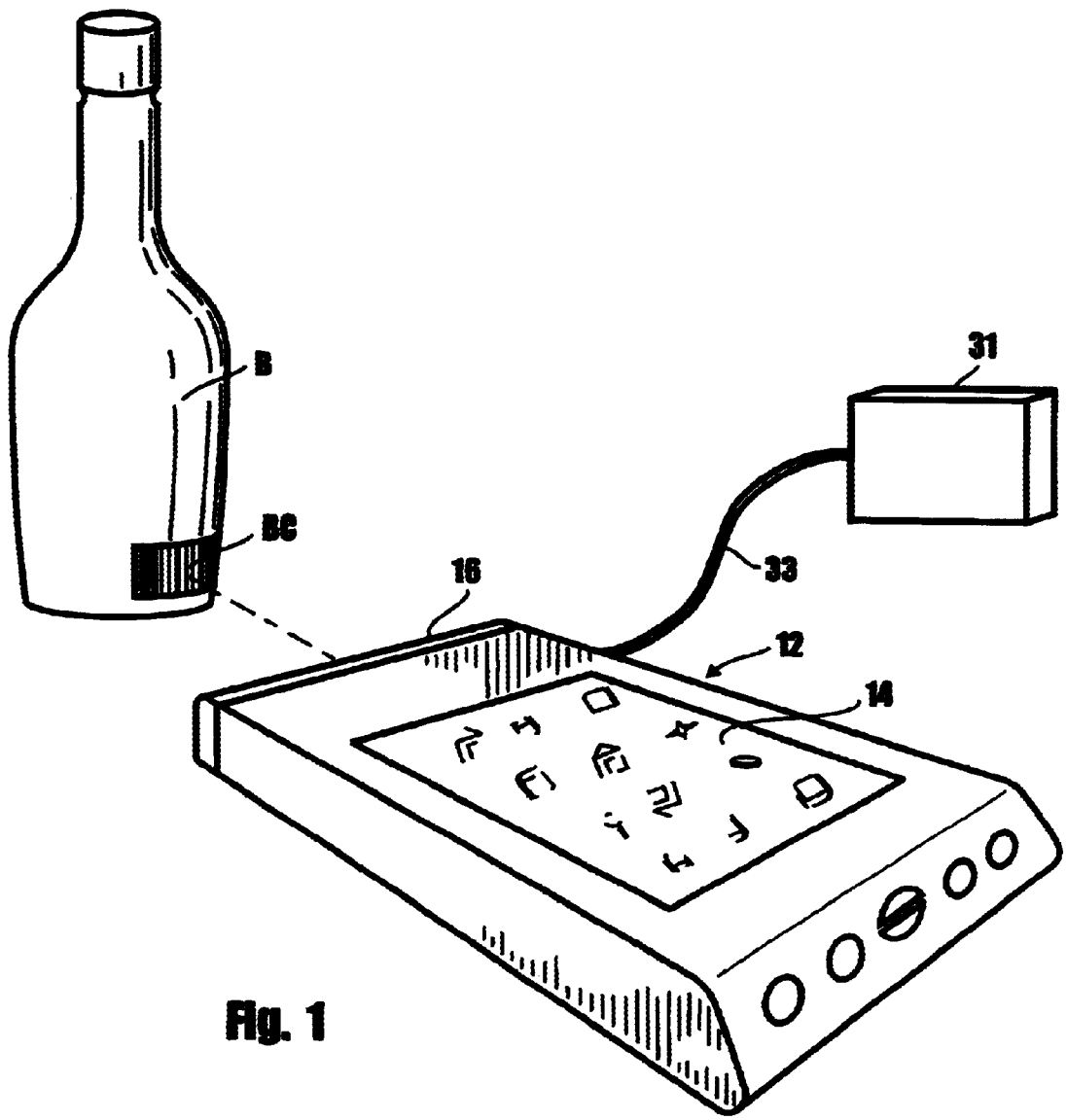
FIG. 1 is a generally perspective, illustrative view of one form of the apparatus of the invention that is used in carrying out the method of the invention.

Referring to the drawings and particularly to FIG. 1, one form of the apparatus of the invention for taking inventory of product such as beverages contained within coded containers is there illustrated. This form of the invention includes data processing means here comprising a hand-held, readily portable computer generally designated in the drawings by the numeral 12. Hand-held computer 12 can take several forms well known to those skilled in the art, but a readily commercially available computer sold by Handspring, Inc. of Mountain View, Calif. has proven satisfactory for carrying out the method of the invention. A novel feature of the hand-held computer 12 is the provision of a touch sensitive screen 14 that can be used to input data into the data storage means of the computer. Details concerning the construction, operation and programming of hand-held computer 12 are readily available from its manufacturer, Handspring, Inc. of Mountain View, Calif.

After suitable programming of computer 12 in a manner well understood by those skilled in the art, product record information can be introduced into the data storage means of computer 12 either through the use of a conventional keyboard (not shown) or alternatively via the touch-sensitive screen 14. If a keyboard is not used, a graffiti system programmed into the computer enables data entry by touching the computer screen. This graffiti system is described in detail by the manufacturer of the computer, namely Handspring, Inc. Data entered into the computer by the graffiti system as well as other data stored within the data storage means of the computer can readily be displayed on the touch-sensitive screen in a manner well understood by those skilled in the art. The data storage means of computer 12 includes program memory means for storing data for controlling the computer as well as for creating inventory reports in accordance with the method of the invention. This latter data includes information correlating conventionally used product names and conventionally used product barcodes with the shape or silhouette of the product container.

Also comprising a part of the data processing means of the invention is input means for generating and transmitting for each coded container a signal identifying the product contained within the coded container. This input means here comprises sensor means for sensing the code of the coded containers that contain the product to be inventoried as, for example, a barcode affixed to the containers. In the present form of the invention, the sensor means comprises a conventional sensor or barcode reader 16 (FIG. 1) for reading the barcodes "BC" contained on containers containing the beverages to be inventoried, such as a liquor bottles "B" of the character shown in FIG. 1. The sensor means, or barcode reader 16, is operably interconnected with the hand-held computer so that, through the use of the operating software, the product information sensed by the sensor means can be automatically transmitted to the data storage means of the computer.

The barcode, such as barcode "BC" that is a fixed by the beverage container "B" (FIG. 1) sets forth information that identifies the product contained within the container. As previously mentioned, data stored within the computer permits the computer software to also uniquely identify the silhouette of the container that corresponds to the barcode or to the product name. In a manner presently to be described, if the liquor bottle or other container does not have a commercial barcode, the name of the product appearing on the package label can be used, or alternatively, a special code can be supplied for use in association with the particular container. It is to be understood that the code appearing on the coded container can be an identification label displaying the product name, or it can be a conventional barcode, or it can be another type of readable code that can be connected with the shape of the container.

Figure 2:
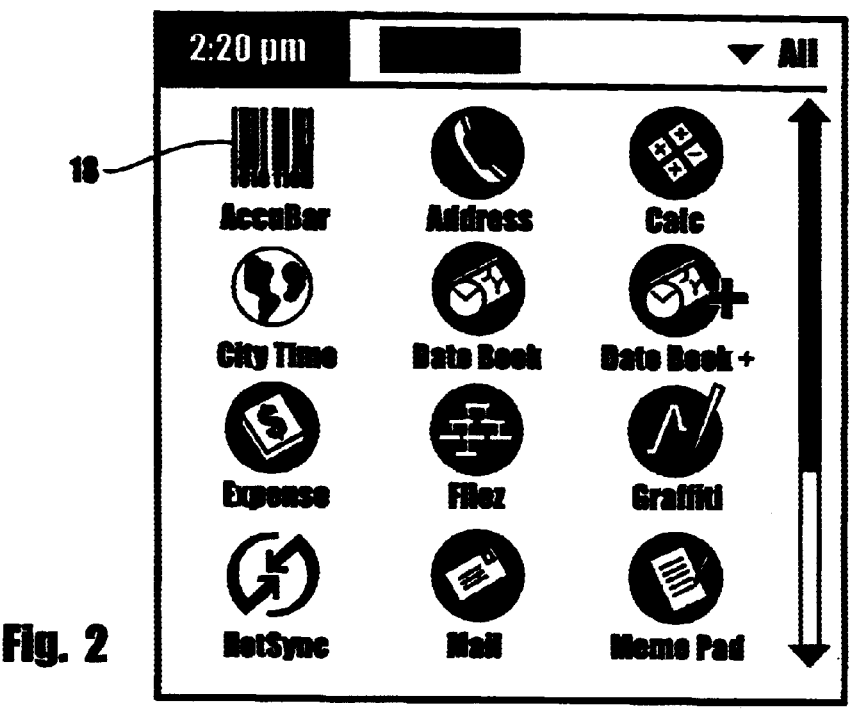
Figure 3:
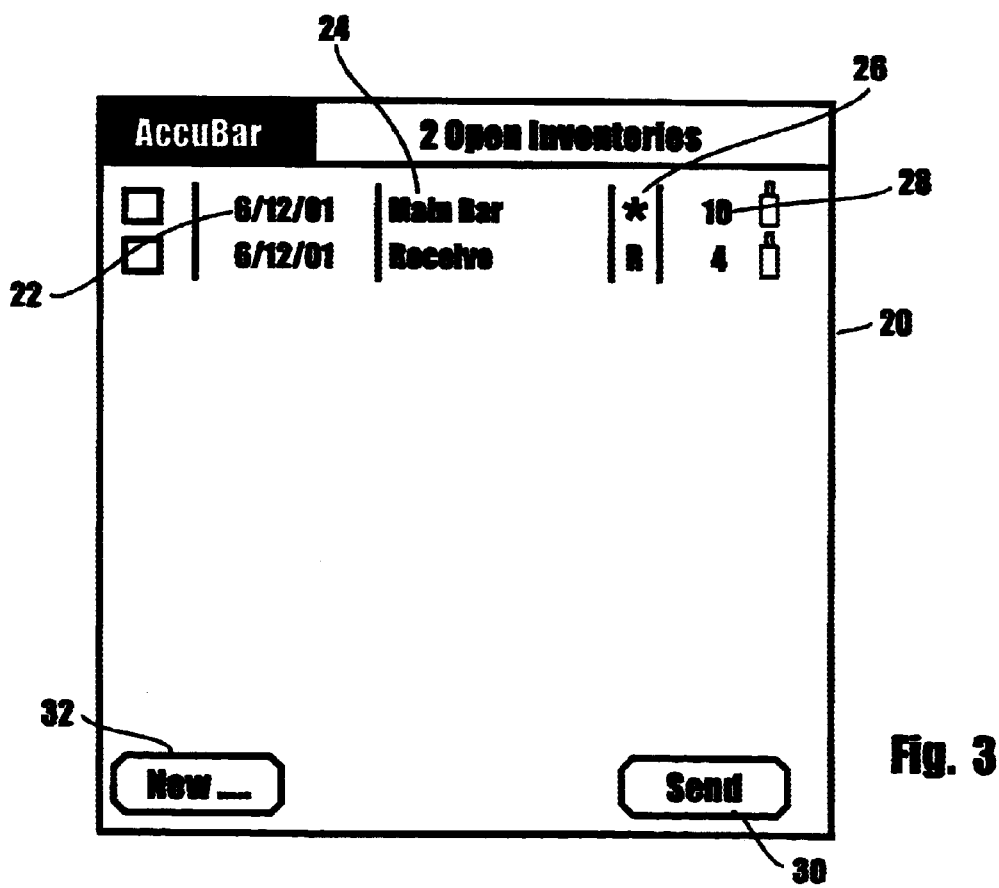
FIG. 3 is a generally diagrammatic view of an open inventory screen that appears when the "AccuBar" symbol is touched on the touch sensitive screen of the computer.

In accordance with one form of the method of the invention, turning on the previously preprogrammed computer 12 will cause an application screen to appear such as that illustrated by way of example in FIG. 2 of the drawings. The application screen allows the user to access all of the programs stored within the data storage means of the computer, including the inventory program (AccuBar) that is the subject of the present invention. Commencement of the inventory program is accomplished by touching the inventory program symbol identified in FIG. 2 by the numeral 18. Touching symbol 18 will open the inventory screen 20, the character of which is illustrated in FIG. 3 of the drawings. If an inventory has previously been opened, the user will see a display such as that shown in FIG. 3. If no inventory has been previously opened, the screen will be blank.

Referring particularly to FIG. 3, the first date field 22 at the left of the screen depicted in this figure, shows when the inventory was begun. The second field 24 shows the name that was assigned to that particular inventory and the third field 26, having either an asterisk or the letter "R", denotes whether the inventory contains in-stock items (asterisk) or receiving items ("R"). The field 28 to the right of FIG. 3 indicates how many bottles have already been scanned into the inventory. Touching on the "send" button 30 on the screen shown in FIG. 3 will cause the software to transmit to the central server 31 (FIG. 1) any open inventories that have been designated as a result of putting the check mark next to them.

Figure 4:
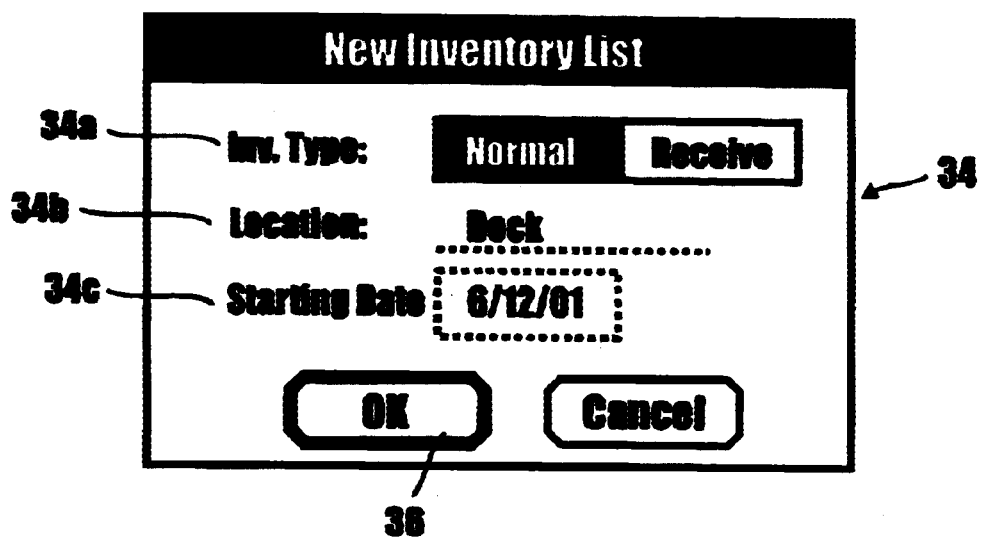
FIG. 4 is a generally diagrammatic view of the screen that appears when the "New" symbol is touched on the screen of FIG. 3.
Figure 5:
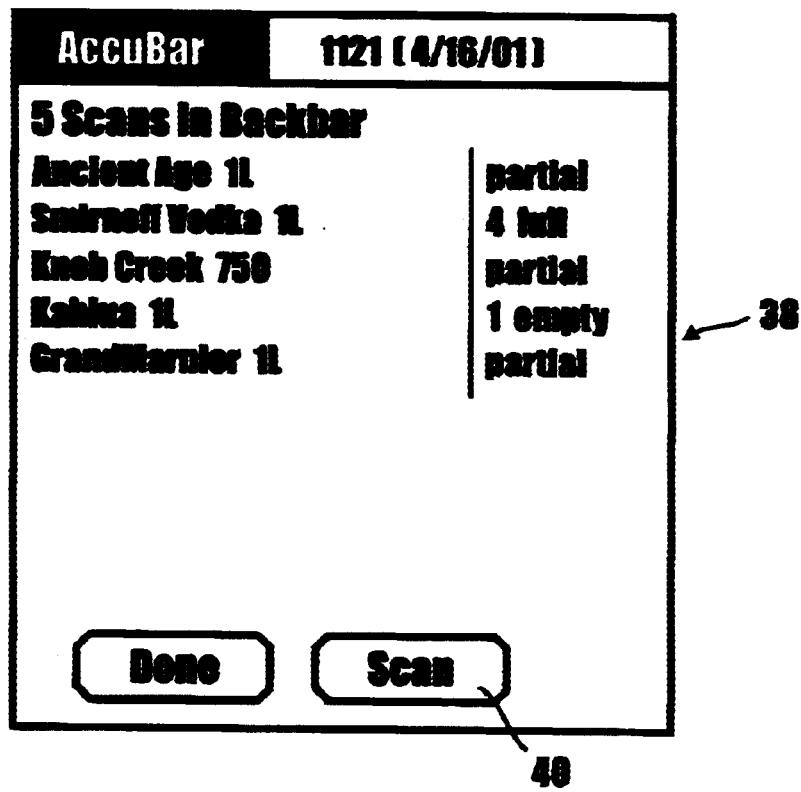
FIG. 5 is a generally diagrammatic view of the screen that appears upon touching the "OK" symbol on the screen shown in FIG. 4.
Figure 6:
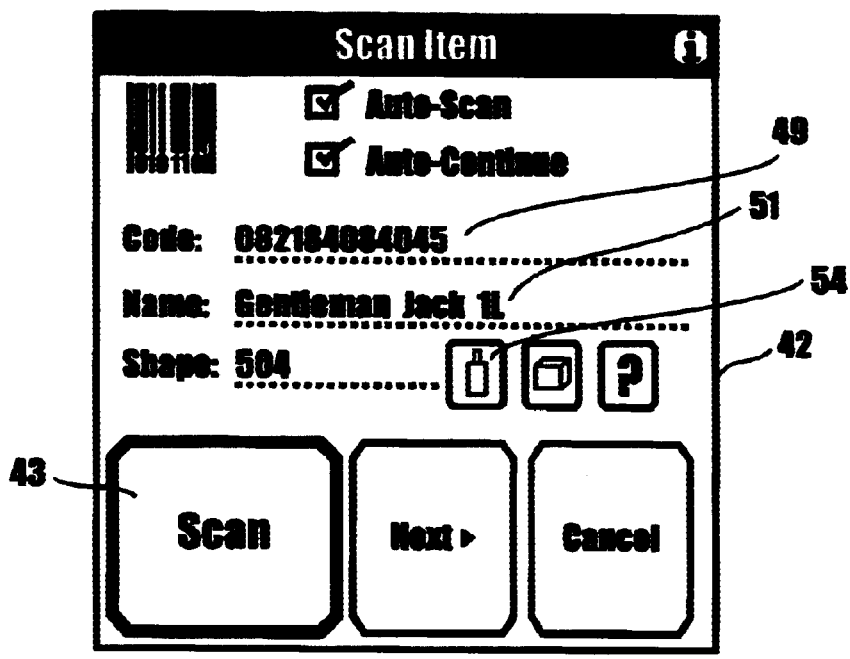
FIG. 6 is a generally diagrammatic view showing the screen that appears upon touching the "Scan" symbol on the screen shown in FIG. 5.
Figure 7:
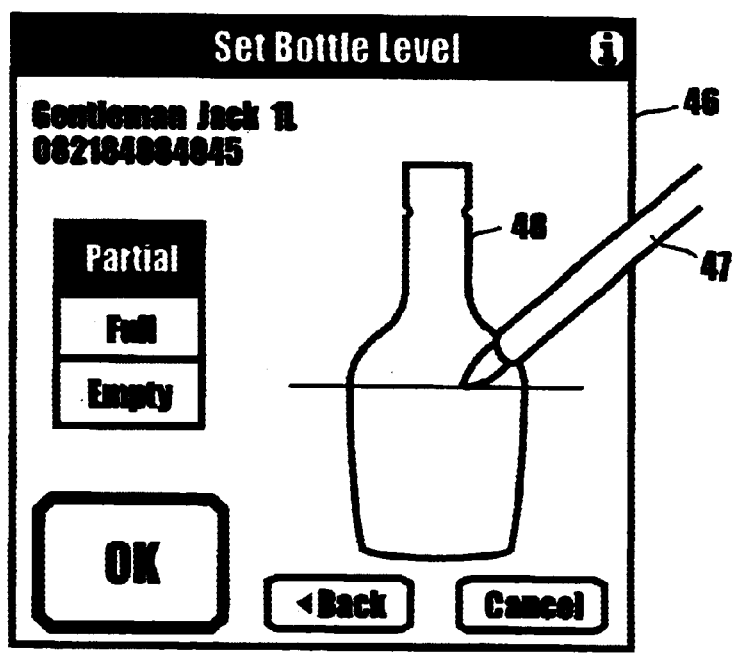
FIG. 7 is a generally diagrammatic view of the screen that appears upon positive identification of a recognized code and upon touching the "Scan" symbol on the screen shown in FIG. 6.

Touching the "new" symbol 32 located at the bottom of the screen shown in FIG. 3, will cause the software to display on the computer screen 14 the "New Inventory List" screen 34 shown in FIG. 4. This screen allows the user to open a new inventory in the manner presently to be described. The first field 34a at the left of the screen indicates the type of inventory to be performed, that is "Normal" if items in stock are to be inventoried or "Receive" if receivables are to be inventoried. The location field 34b permits selection of a particular area to be inventories as, for example, a receiving dock. The "Starting Date" field 34c shows the starting date of the new inventory. Touching the "OK" symbol 36 on the screen depicted in FIG. 3 will cause the inventory detail screen 38 to appear (see FIG. 5). This screen, which will appear empty until the first item has been inventoried, functions to list the inventory items as they are scanned into the inventory in a manner presently to be described. By touching the "scan" symbol 40 on the screen depicted in FIG. 5, the Scan Item screen 42, shown in FIG. 6, will appear. On the scan item screen shown in figure 6, selection of the "Auto-Scan" option allows the user to quickly scan one bottle after another without having to touch the "Scan" symbol each time. Touching the "Autocontinue" option will cause the software, after each recognized scan, to open the "Set Bottle Level" screen 46, shown in FIG. 7, the character of which will presently be described.

To accomplish the product scan, the "Scan" symbol 43 on screen 42 is touched and the hand-held computer along with the sensor means is moved over the barcode. As the sensor means moves over the barcode, it will transmit product identification signals to the computer as it optically senses transitions between the black bars and while stripes of the barcode, the width of which define the unique code for each product. More specifically, during the scan step, the interval between sequential signals is timed and the time intervals between the transition signals are used to derive a relationship between the width of the bars and stripes on the barcode. The product identification signals that are derived from this relationship are then compared by the data processing means to other product identification information that has been previously entered into the computer data storage means as a part of a product record.

As previously discussed, the product record stored within the data storage means of the computer contains information specifying each particular product and the shape of its container. Upon scanning a given barcode and upon detection of a product identification signal by the sensor means for which there exists a product record, the pre-installed software will cause the computer to automatically display the Set Bottle Level screen 46 shown in FIG. 7. This unique screen will display pertinent product information including a display 48 that comprises the silhouette of the container that corresponds to the barcode affixed to the container. In accordance with the method of the invention, this screen permits entry into the data storage means of important information concerning the quantity of an item that has been scanned. For example, by touching the "full" symbol, data indicating that a selected number of full bottles of the item have been scanned can be recorded. In similar manner, breakage can also be accounted for by touching the "empty" symbol that enables the recordation of information concerning the number of empty bottles that have been scanned. An important feature of the present invention resides in the ability of the inventory taker to use this screen to expeditiously record the quantity of the beverage remaining in a partially filled bottle that has been scanned. This important step can be accomplished by simply touching the stylus 47 on the silhouette 48 shown on the screen (FIG. 7) to indicate the level of the beverage remaining within that particular bottle. More particularly, this important information entering means permits the expeditious entry in to the data storage means of product record information, including a fluid level indication on the silhouette 48 of the coded container of the level of beverage contained within the coded container.

During the scanning step, should the scanner be unable to recognize the code on the bottle, or if the bottle does not display a code, the input means must be used to enter from the product label, or like identifier, the name of the product in the name field 51. If the installed software recognizes the data inputted by the input means, the computer will automatically display the Set Bottle Level screen 46 and the inventory can proceed. If the installed software does not recognize the data inputted, the name of the product along with other product identification data can be entered into the data storage means using the earlier mentioned graffiti function or, alternatively, by using an attachable keyboard that can be attached to the computer unit. Product identification data typically entered into the data storage means includes the product name as well as the bottle size (one liter, 750 milliliters, etc.). After entering the product identification data, the user can also enter into the data storage means, a shape corresponding to the bottle shape. More particularly, tapping on the small bottle symbol 54 that appears on computer screen 42 (FIG. 6) the preprogrammed computer software will take the user to a built-in bottle shape library. In this library, the user can page through the various shapes typically found in the industry. Touching the scan button on FIG. 6 will take the user to the Set Bottle Level screen shown in FIG. 7. Touching on the "OK" button on this screen assigns the shape shown on the screen to the product identified on the previous screen shown in FIG. 6.

After everything in the inventory has been scanned and entered the information can be transferred to the central computer 31 via a conventional modem (not shown) and a phone line 33 (FIG. 1). This is accomplished by a touching the send symbol 30 that appears on the screen shown in FIG. 3. Upon touching the send symbol 30, a box will appear on the screen asking the user to confirm the intent to transmit all selected inventories. In this regard, it is to be understood that in order to transmit the different inventories, the scanner unit 16 must be removed from the hand-held computer and replaced with a modem unit that is of a conventional design and can be interconnected with phone line 33. Touching the "Yes" symbol 38 on the screen shown in FIG. 3 will begin the data transmission sequence. In a manner well understood by those skilled in the art, the central computer 31 will sort and process the data transmitted to it and will produce a detailed report of the inventory for use by the use of the system.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A system for taking inventory of product contained within coded containers each having a readable code, said system comprising:

(a) input means for generating and transmitting for each coded container a signal identifying the product contained within the coded container and the silhouette of the coded container;

(b) data processing means operably associated with said input means for receiving said signal from said input means, said data processing means having data storage means containing, for each code on the coded containers, product information, including the type of product and the silhouette of the container associated with the code, said data processing means upon receiving said signal from said input means, operatively responding to correlate said signal with said product information corresponding to said code to produce a product description that includes an identification of the silhouette of the container within which the product is contained, said data processing means comprising:

(i) display means for displaying said product description, including a visual display of the silhouette of the container;

(ii) information entering means for entering product record information into the data storage means, including an indication on said silhouette of the coded container of the level of product remaining in the coded container; and (iii) program memory means containing data for controlling said data processing means and for creating at least one inventory report by operatively correlating said product identification information with said product record information to calculate the quantity of product contained within the coded container.

2. The system as defined in claim 1 in which said input means comprises sensor means for sensing the readable code of the coded container.

3. The system as defined in claim 2 in which said readable code comprises a label identifying the product contained within the coded container.

4. The system as defined in claim 2 in which said readable code comprises a barcode.

5. The system as defined in claim 4 in which said sensor means comprises a barcode reader.

6. The system as defined in claim 5 wherein the coded containers from which the liquor is dispensed are glass bottles.

7. The system as defined in claim 6 wherein the code associated with each glass bottle is a barcode attached to the bottle.

8. A system for taking inventory of beverages contained within coded containers having a readable barcode, said system comprising:
   (a) a barcode reader for reading the barcode and for generating and transmitting for each coded container a signal identifying the product contained within the coded container and the silhouette of the container;
   (b) a computer operably associated with said barcode reader for receiving said signal from said barcode reader, said computer having a touch sensitive screen and data storage means containing, for each code on the coded containers, product information, including the type of product and the silhouette of the container associated with the code, said computer upon receiving said signal from said barcode reader, operatively responding to correlate said signal with said product information corresponding to said barcode to produce a product description that includes an identification of the silhouette of the container within which the product is contained, said computer comprising:
      (i) display means for displaying on said touch sensitive screen said product description, including a visual display of the silhouette of the container;
      (ii) information entering means for entering product record information into the data storage means by means of said touch sensitive screen, said product record information including an indication on said silhouette of the coded container of the level of the beverage contained within the coded container; and
      (iii) program memory means containing data for controlling said computer and for creating at least one inventory report by operatively correlating said product identification information with said product record information to automatically calculate the quantity of beverage contained within the coded container.

9. The system as defined in claim 8 wherein the product dispensed is of a liquor type.

10. The system as defined in claim 9 wherein the containers from which the liquor is dispensed are glass bottles.

11. A method for taking inventory of product contained within coded containers using a computer having data storage means for containing product information, including the type of product and the silhouette of the container containing the product, input means for generating and transmitting for each coded container a signal identifying the product contained within the coded container and a silhouette of the coded container, program memory means containing data for controlling the computer, information entering means for entering information into the data storage means, said information entering means comprising a touch sensitive screen, said method comprising the steps of:
   (a) using the input means identifying on the touch-sensitive screen the product including the silhouette of the container containing the product; and
   (b) using the information entering means, entering information comprising a fluid level indication on the silhouette appearing on the touch-sensitive screen of the level of the product remaining within the container, said computer means operatively responding upon receipt of the fluid level indication to enter into data storage means said fluid level indication.

12. The method as defined in claim 11 including the further step of transmitting the fluid level indication from the data storage means to a central computer for using the level indication to calculate the quantity of product remaining in the coded container.

\* \* \* \* \*